United States Patent [19]
Dwin et al.

[11] Patent Number: 5,694,585
[45] Date of Patent: Dec. 2, 1997

[54] PROGRAMMABLE MEMORY CONTROLLER AND DATA TERMINAL EQUIPMENT

[75] Inventors: David Dwin, Carrboro; William Robert Lee, Apex; David William Nuechterlein, Durham, all of N.C.

[73] Assignee: International Business Machines Corporation, Armonk, N.Y.

[21] Appl. No.: 337,697

[22] Filed: Nov. 10, 1994

[51] Int. Cl.$^6$ .................................................. G06F 13/16
[52] U.S. Cl. ........................... 395/521; 395/503; 395/513; 345/197; 364/238.4
[58] Field of Search .................................. 395/162–166, 395/427, 431, 432, 438, 481, 494, 502, 503, 504, 513, 520, 521; 345/197, 198; 365/78, 191; 364/238.4, 926.5, 926.92; 326/37, 46, 105; 377/2, 54, 64–87

[56] References Cited

U.S. PATENT DOCUMENTS

| | | | |
|---|---|---|---|
| 5,001,652 | 3/1991 | Thompson | 395/164 |
| 5,301,278 | 4/1994 | Bowater et al. | 395/405 |
| 5,307,320 | 4/1994 | Farrer et al. | 365/230.01 |
| 5,418,924 | 5/1995 | Dresser | 395/494 |
| 5,522,064 | 5/1996 | Aldereguia et al. | 395/550 |

OTHER PUBLICATIONS

Morton H. Lewin, Logic Design and Computer Organization, Addison–Wesley Publishing Co., 1983, pp. 57–62, 126–134.

*Primary Examiner*—Kee M. Tung
*Assistant Examiner*—U. Chauhan
*Attorney, Agent, or Firm*—Joscelyn G. Cockburn

[57] ABSTRACT

A programmable memory controller includes a plurality of multi-bit registers, with each multi-bit register coupled to a cycle generator. Each cycle generator is formed from a multi-bit shift register and control signals which drive each multi-bit shift register so that data in an associated multi-bit register is shifted through the shift register to form desired memory control pulses.

12 Claims, 14 Drawing Sheets

FIG. 1

- 22 GRAPHICS DISPLAY MEANS
- 26 VIDEO ADAPTER
- RED GREEN BLUE
- 20 CLUT AND DAC
- 18 GRAPHICS VIDEO BUFFER
- 16 GRAPHICS CONTROLLER
- 24 VIDEO PROCESSOR
- 27
- 15 VIDEO DECODER
- 25
- 23
- 11 PC BUS
- 10 PC
- 14 OP SYSTEM
- 12 APPL PROG

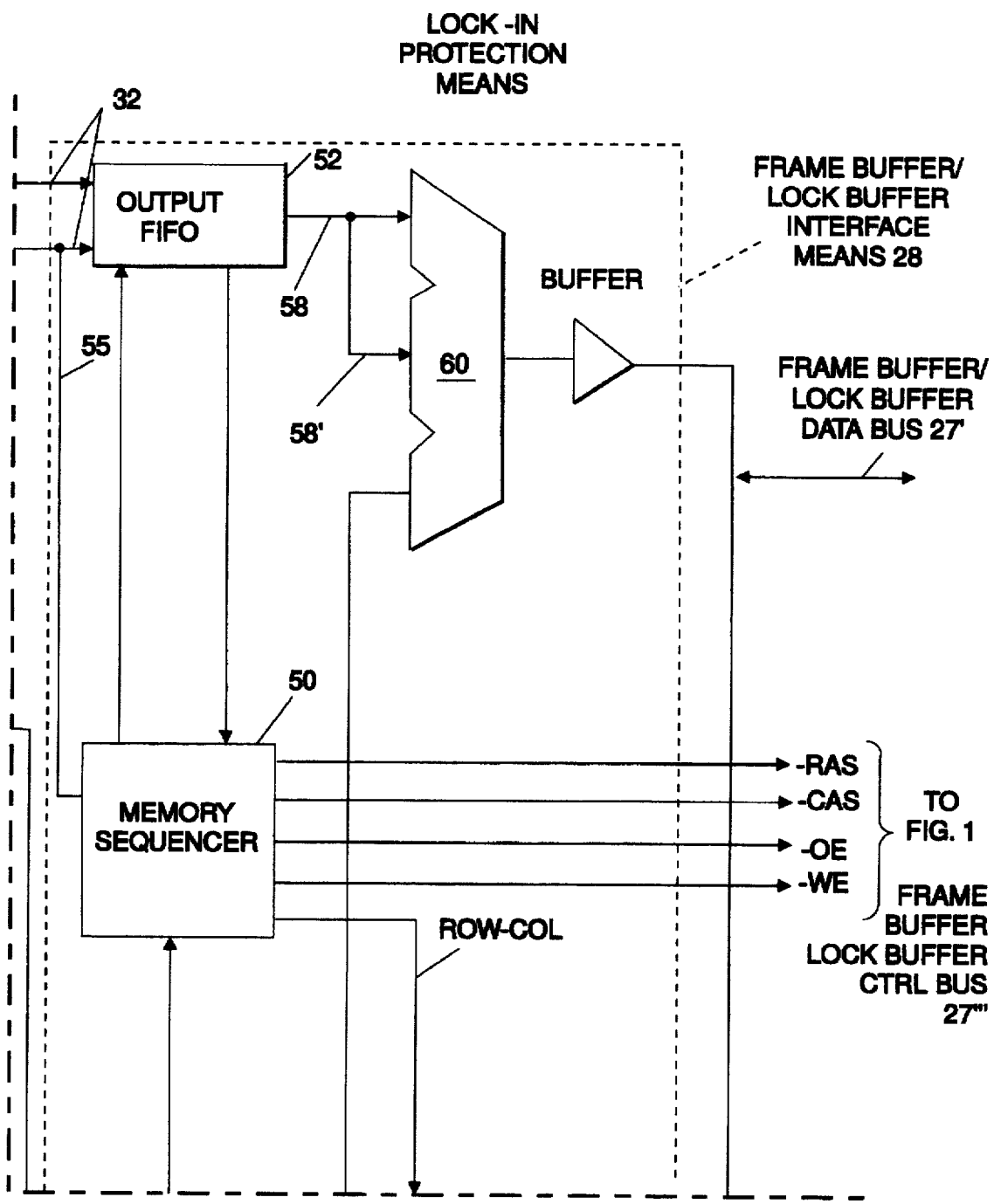

LOCK-IN
POSITION
MEANS

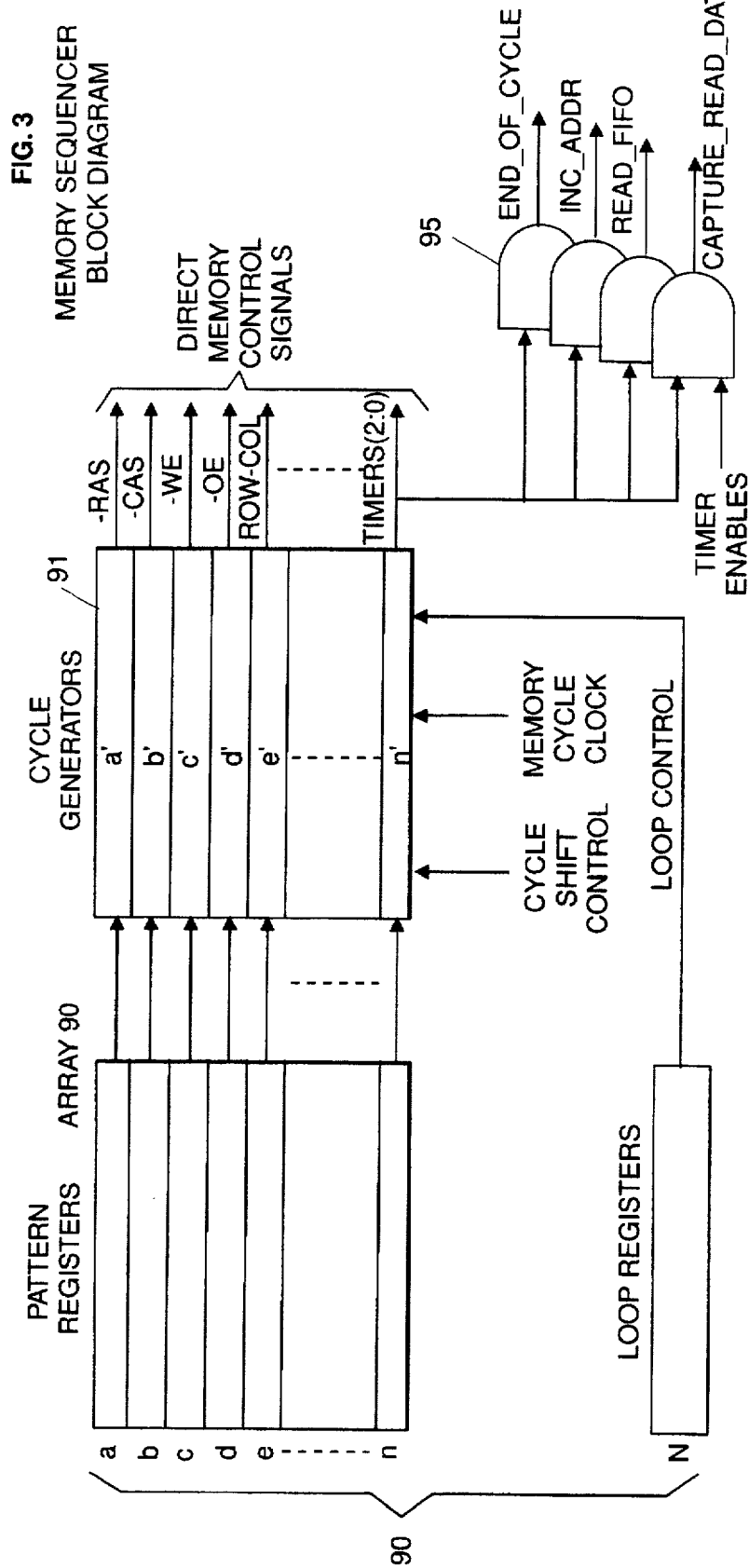

MCSM FLOW CHART

CCSM FLOW CHART

PRELUDE, BODY & POSTLUDE CYCLE

PRELUDE, BODY & BODY ONLY CYCLE

PRELUDE & BODY CYCLE

PRELUDE - ONLY CYCLE

BODY & POSTLUDE CYCLE

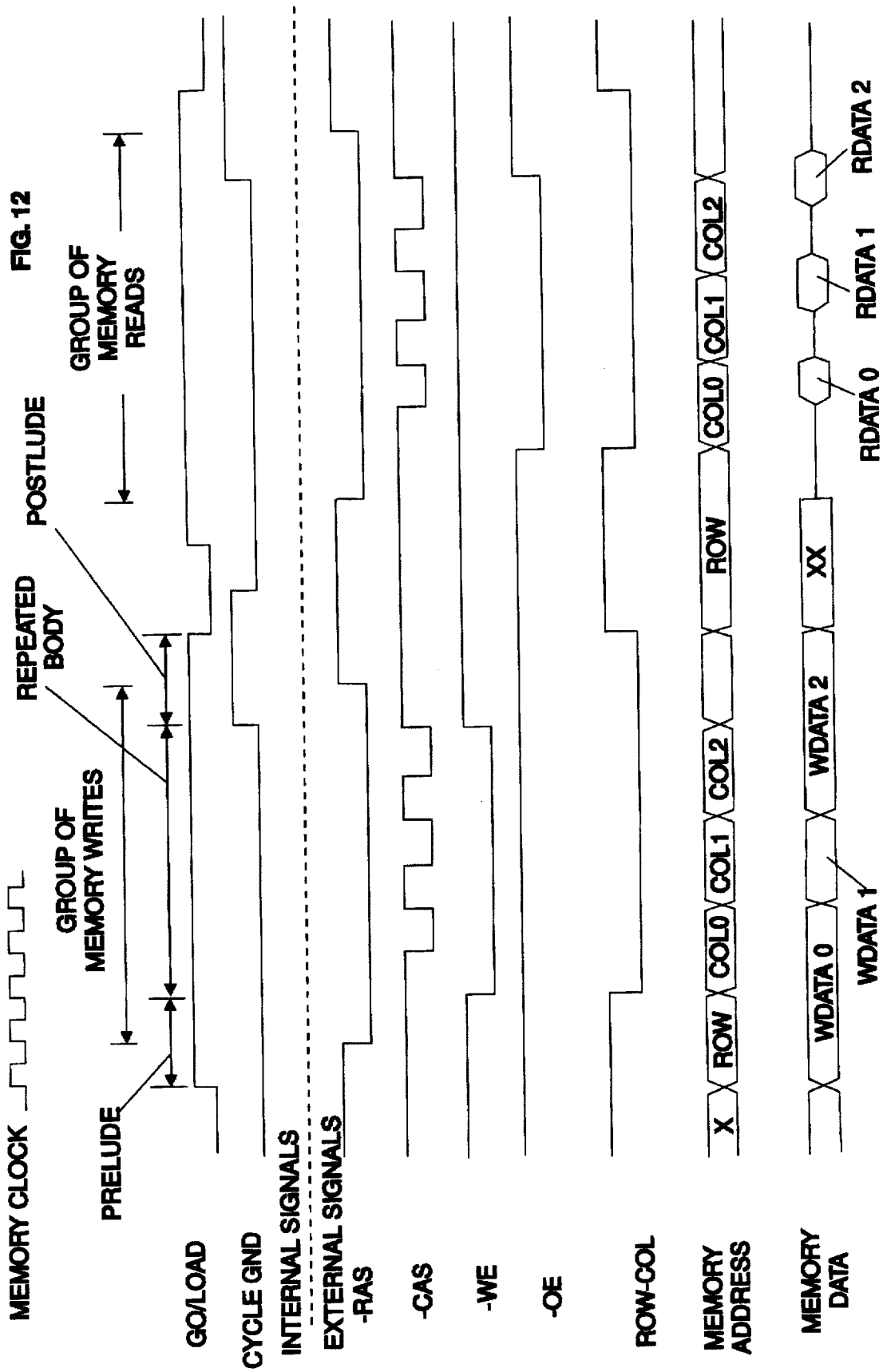

PROGRAMMABLE MEMORY CONTROLLER AND DATA TERMINAL EQUIPMENT

CROSS REFERENCE TO RELATED PATENT APPLICATION

The referenced patent applications, assigned to the assignee of the present invention, are related and incorporated herein by reference.

1. U.S. patent application Ser. No. 08/322,673 relates to a device which protects information in a multi-media workstation.

2. U.S. patent application Ser. No. 08/153,004 relates to a device which scales real-time image frames in multi-media workstations.

BACKGROUND INVENTION

1. Field of the Invention

The present invention relates to memory controllers in general and, in particular, to memory controllers which control computer memories.

2. Prior Art

Memory controllers which interface computer processors with memories are well known in the prior art. A conventional memory controller consists of circuit arrangements which receive enabling signals from a processor and generate memory control signals. The memory control signals, if applied to selected pins of a memory module, allow the processor access to the memory. The prior art memory controllers includes the following U.S. Pat. Nos.: 4,980,585; 4,797,746; 4,878,194; 4,658,350; 4,656,597; 4,654,804; 4,276,595, and 4,881,190.

Even though the prior art memory controllers work well for their intended purposes, the memory controllers are custom designed to function with a particular memory and cannot be easily retro-fitted to work with an improved or different type memory.

The prior art has recognized the need for more flexible design in memory interfaces and has addressed the problem only as it relates to timing of signals used in the memory. Examples of the prior art improvements are set forth in U.S. Pat. No. 4,673,930; and IBM® TDB Vol. 31, No. 9, February 1989 (Pg. 351) and IBM® TDB Vol. 32, No. 10A, March 1990 (Pg. 118). Even though this is a step in the right direction, the devices do not provide a universal memory controller suitable to be retrofitted easily to compensate for changes in the memory.

The problem is even more challenging to a designer when the interface is to be used with Dynamic RAM Memories (DRAM). Similar to rapid changes in microprocessors design, the design of DRAM memories are constantly changing. The constant changes are not usually reflected in the target memory interface specifications. Among the factors influencing the change are: target memory chips are in the development stage, memory bus capacitance changes due to planned future products, memory technology evolving to higher densities and performance and possible system architecture changes (for example, moving from DRAM to VRAM).

Typically, a memory interface designed in this type of environment would require a significant amount of timing margins built into the design. This solution results in a lower performance interface and in some cases, the Required Memory Bandwidth for a product would not be achieved. In addition, when higher speed memory chips come on the market, the typical memory interface must be engineering changed (E.C.'d) before the product can take advantage of the better performance, and quickly becomes obsolete by competition offering the same function, utilizing the higher speed RAMs.

SUMMARY OF THE INVENTION

It is, therefore, the main object of the present invention to provide a universal memory controller which interfaces a computer with any type of memory.

It is another object of the present invention to provide a memory controller which is easily retrofitted to compensate for changes in the memory and/or related system using the memory.

The memory controller according to the teachings of the present invention is a Highly Programmable Shift Register Based Memory Controller including a loaded N bit shift register (called a cycle generator) which is controlled to shift a bit pattern to generate a particular signal pattern for accessing the memory. The bit pattern to be shifted is loaded into a pattern register which is connected to an input stage of the shift register. A plurality of the cycle generators and connected pattern registers are stacked to provide the memory control signals. Preferably, a microprocessor loads the bit pattern into each pattern register prior to the beginning of a memory cycle. In addition, a Memory Control State Machine (MCSM) and Cycle Control State Machine (CCSM) provide the control signals for driving the cycle generators.

Each state of the cycle generators is individually controlled to retain a current value (i.e., do not shift), shift in a previous shifter element value, load the pattern register value and loop on a selected set of shift register stages. As a consequence, a shifted pattern can be separated into distinct sections.

In one embodiment, the shifted pattern is broken up into three sections called the prelude, the body, and the postlude. This feature is particularly beneficial during page mode memory cycles in which the body of the shift pattern can be used as the repeating portion of the page mode cycle and the prelude and postlude ensure that the desired memory cycle is entered and exited with proper memory timings.

In addition, a "Wait State" can be programmably associated with each shift position. The "Wait State" feature repeats the pattern at a selected shift position for an additional clock cycle versus a normal single clock cycle.

Other objects, features, and advantages of the present invention will become apparent from the following detailed description when taken in conjunction with the accompanying drawings.

BRIEF DESCRIPTION OF THE DRAWINGS

FIG. 1 shows a block diagram of a system, such as a multi-media workstation, embodying the teachings of the present invention.

FIGS. 2A, 2B and 2C show a block diagram of a video processor module which generates the memory control signals according to the teachings of the present invention. The memory control signals provide access to the video buffer.

FIG. 3 shows a block diagram of the memory sequence means 50 (FIG. 2B).

FIG. 12 shows control signals generated according to the teachings of the present invention.

DETAILED DESCRIPTION OF THE PREFERRED EMBODIMENT

Figure 2A:
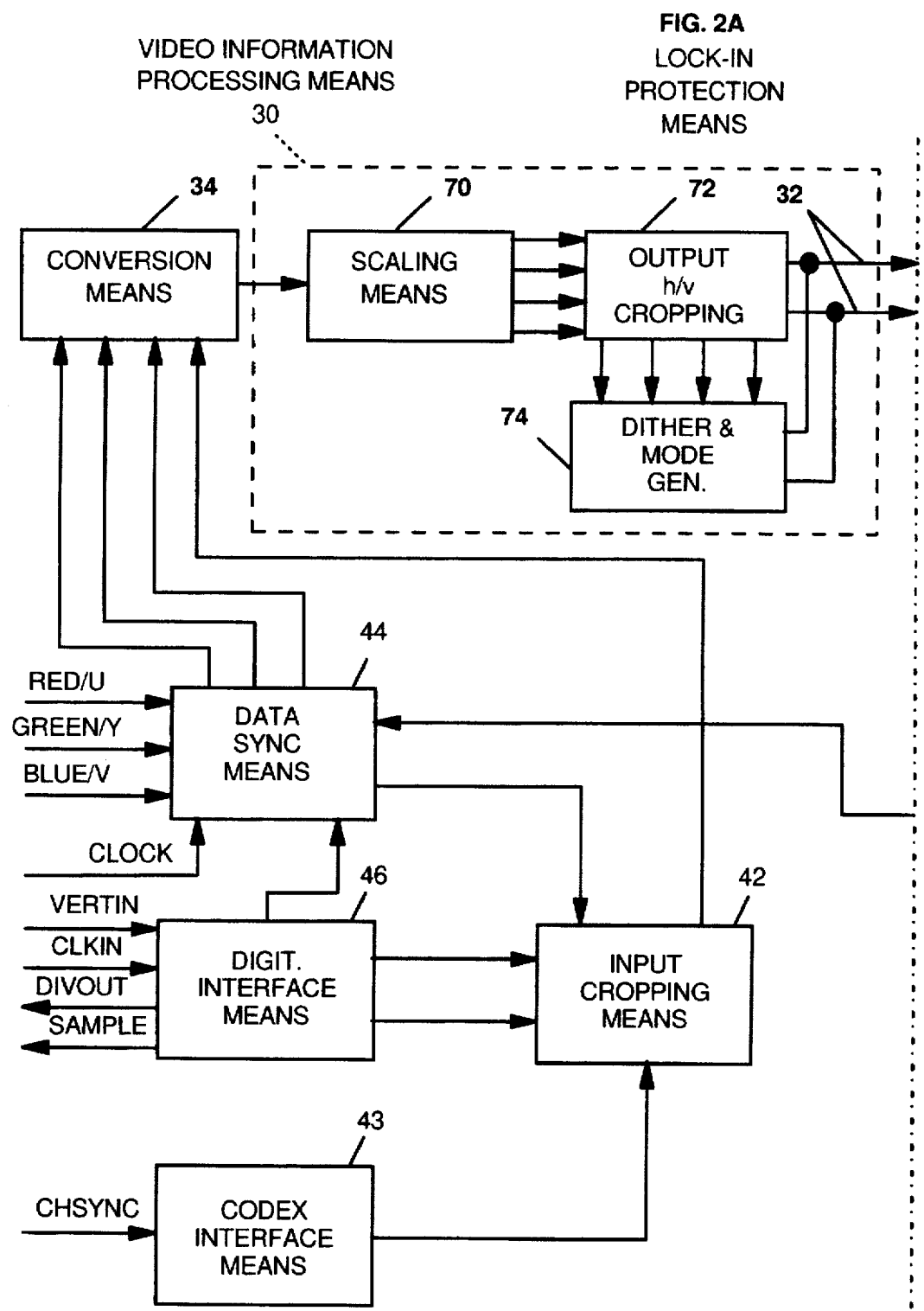

The memory controller described hereinafter can be used to interface any type of memory with a processor. The memory controller works well in a multi-media workstation and, as such, will be described in that environment. Notwithstanding, this should not be construed as a limitation on the scope of the invention since the memory controller is intended to be used in any environment where memory control signals, including Row Address Signal (RAS), Column Address Signal (CAS), Write Enable (WE) signal and Output Enable (OE) signal are required to access the memory.

FIG. 1 shows a system diagram of a multi-media workstation including the teachings of the present invention. The system includes a personal computer (PC) 10 with a PC Bus 11 shown externally for purposes of description. A video adapter 26 is coupled to PC Bus 11 and provides scaled real time television images, which are displayed simultaneously with computer graphics and/or text data, some of which are protected on a conventional graphics display means 22, such as a CRT display means.

Still referring to FIG. 1, the information to be displayed on the graphic display means 22 are stored in the graphic video buffer 18. According to the present invention, the memory controller which provides the signals for accessing the graphic video buffer 18 (memory) are positioned within the video processor. The signals (including RAS, CAS, OE, and WE) generated are transmitted on bus 27 to the memory.

The PC 10 executes an operating system 14 which provides multitasking functions and windowing on the graphic display in which the video image, text and/or graphic data and protected information are displayed. Any conventional multitasking operating system such as OS/2$^R$ can be used in PC 10 to provide the multitasking environment and the windowing partitioning of the graphic display means 22. In addition, one or more application programs, such as application program 12 which is a user-provided item, could be executed in PC 10 on top of the operating system 14. Such an application, if required, could provide information relative to the protection mechanism in video processor 24 and/or the type of memory for which the memory controller (to be described subsequently) in video processor 24 is to control. Alternately, information relative to memory type could be entered from a keyboard connected to the processor, in a conventional way.

Still referring to FIG. 1, the video adapter 26 includes graphics controller 16, graphics video buffer 18, color look-up table/digital to analog converter (CLUT/DAC) means 20, video decoder means 15, and video processor 24. The interconnection of the named units are shown in FIG. 1 and, for brevity, will not be repeated. The graphics controller 16 can be purchased as a standard off shelf item. It attaches to a computer system bus, such as PC Bus 11, and allows (and/or assists) an application program, such as 12 running in the PC 10, to alter the contents of the graphics video buffer 18 and to control the operation of video processor The graphics video buffer (GVB) 18 is a memory buffer, having according to the teachings of the present invention, a display section containing data which corresponds to regions of the graphic display screen 22. The area of the memory buffer that contains the graphics and/or video data displayed on the screen is commonly referred to as a frame buffer. According to the teachings of the present invention, the section of the video buffer called a "lock-buffer" carries lock data which is an image or shadow of the frame buffer. As will be described in more detail hereinafter, a lock buffer controller uses the contents of the lock buffer to determine the location in the frame buffer whereat information can be written. Consequently, selection information can be overlay and/or underlay video information in the frame buffer and ultimately on the display screen.

Still referring to FIG. 1, the color look-up table/digital to analog converter (CLUT/DAC) 20 provides a final mapping from the particular frame buffer representation into an analog RGB (Red, Green and Blue) signal necessary to drive the graphics display 22. The CLUT/DAC 20 is a conventional off-shelf device and further description will not be given. The video decoder 15 is a standard device which decodes a composite or S video signal into analog RGB or YUV, and then digitizes it to produce a digital RGB or YUV representation of the signal on its output. The video signal on terminal 23 can be provided in the NTSC or PAL (phase alternation line) format. In addition to the video image on terminal 23, a decompressed video image from a codex (compression/decompression) source (not shown) can also be provided on terminal 25. The video image on terminal 25 or the video image outputted from the video decoder 15 is forwarded to video processor 24. The video processor 24 is interconnected by bidirectional bus 27 to the graphic controller 16 and the graphic video buffer 18. As will be explained in greater detail hereinafter, the video processor 24 receives realtime video images and among processing functions crops the image horizontally and vertically, scales the image horizontally and vertically, provides the lock mechanism which generates control signals which inhibit the writing and/or refreshing of data in selected areas of the frame buffer, and converts the image data to the desired color space (RGB to YUV or YUV to RGB). The video processor then transfers the scaled/color space converted image into the correct location within the frame buffer for display on the graphic display screen 22. The memory control pulse provided by the video processor is the subject of the present invention and will be described in detail hereinafter.

Based on the above description, it can be concluded that video input signals from a TV turner, video, tape recorder, or video camera presented in NTSC or PAL standard format or as a decompressed video stream from a video codec are processed, including the preservation of data, such as icons or the like by video processor 24, and are displayed in an adjustable size window on computer graphic display screen 22 simultaneously with other graphics or text data on the display. In addition, due to the locking mechanism feature of the present invention, selected graphic and/or icons are made to overlay and/or underlay the graphics (video information).

FIGS. 2A and 2B show a detailed block diagram of video processor 24. As described previously, the video processor processes video information and places the information in selected areas of the video buffer from whence the information is displayed in selected windows of the computer graphic display screen 22. In addition, the video processor 24 provides the locking mechanism to ensure selected areas of the frame buffer or video buffer are not written or refreshed. The video processor 24 also provides the memory control signals for accessing the memory. As a consequence, selected information can be overlayed or underlayed video information in the buffer. As is used in this document, process means the "video processor" prepares the video information so that it can be displayed on the video screen simultaneously with computer generated graphics/data information.

The video processor 24 includes frame buffer/lock buffer interface means 28 which is coupled to the frame buffer/lock buffer via frame buffer/lock buffer data bus 27', frame buffer/lock buffer address bus 27" and the frame buffer/lock buffer control bus 27'". It is worthwhile noting that the data bus 27', the address bus 27" and the control bus 27'" are identified in FIG. 1 by numeral 27. The frame buffer/lock buffer interface means 28 provides the facility and function through which high speed video information is inserted in selected areas of the video buffer 18 (FIG. 1). The video information processing means 30 receives the high speed video information from conversion means 34, processes the information and transmits it via bus 32 to the frame buffer interface means 28. The register interface means 36 is connected via bus 38 and 38' to the frame buffer/lock buffer interface means 28. Access into and out of the register interface means 36 is obtained via data bus 40 and 40', respectively. The video information into conversion means 34 is provided over respective conductors from input cropping means 42 and data synchronization means 44. Information into the data synchronization means 44 is provided via digitized interface means 46 and data into the input cropping means 42 is provided over conductors from codec interface means 43 and digitized interface means 46. Signals into and out of the data synchronization means 44, digitized interface means 46, and codec interface means 43 are shown by respective arrows and are labeled accordingly.

Still referring to FIGS. 2A and 2B, the frame buffer/lock buffer interface means 28 includes memory sequencer 50 (details to be given hereinafter) which is connected to output FIFO 52. The memory sequencer 50 is enabled, via a control signal on terminal 55, to control or manage the memory. The signal on terminal 55 is provided by the graphics controller means 16 (FIG. 1). Another control into memory sequencer 50 is Write Enable on conductor 53. The signal is provided by Lock-In Protection means 54. Details of the Lock-In Protection means 54 is set forth in the above referenced patent application. Suffice it to say, whenever the Write Enable signal is active, the memory sequencer 50 inhibits (prevents) the writing of data into the frame buffer.

Turning to FIG. 2B for the moment, the memory sequencer 50 provides all direct memory control signals to manage the frame buffer and lock buffer. As stated previously, both buffers are contained in storage means 18 (FIG. 1). The memory control signals include RAS (Row Address Strobe), CAS (Column Address Strobe), WE (Write Enable), and OE (Output Enable), etc. which make up the frame buffer/lock buffer control bus 27'". The memory sequencer 50 also generates the Row/Column (COL) signal on conductor 71.

As stated previously, the memory control signals are fed over bus 27'" to access the graphic video buffer 18. In addition, the memory sequencer 50 provides control signals for the reading of the output FIFO buffer 52 and the advancing of addresses via the address generating means 56 (to be discussed subsequently). The output from the output FIFO buffer 52 is fed over bussess 58, and 58' to multiplexor means 60. The output from multiplexor 60 is fed over the buffer data bus 27'. Another input to multiplexor means 60 is fed over bus 38' from register interface means 36 which interfaces the video processor with external devices, such as the PC 10 or the like (FIG. 1). The output FIFO buffer 52 buffers video data and control information, including No-Write signals, which are held until the memory sequencer 50 gains control or access to the video buffer and lock buffer via interfaces means 28. Once access or control is obtained, the contents of the output FIFO buffer 52 is transmitted into frame buffer 18 (FIG. 1). Of course, the protected area of the frame buffer is not written into.

Figure 2C:
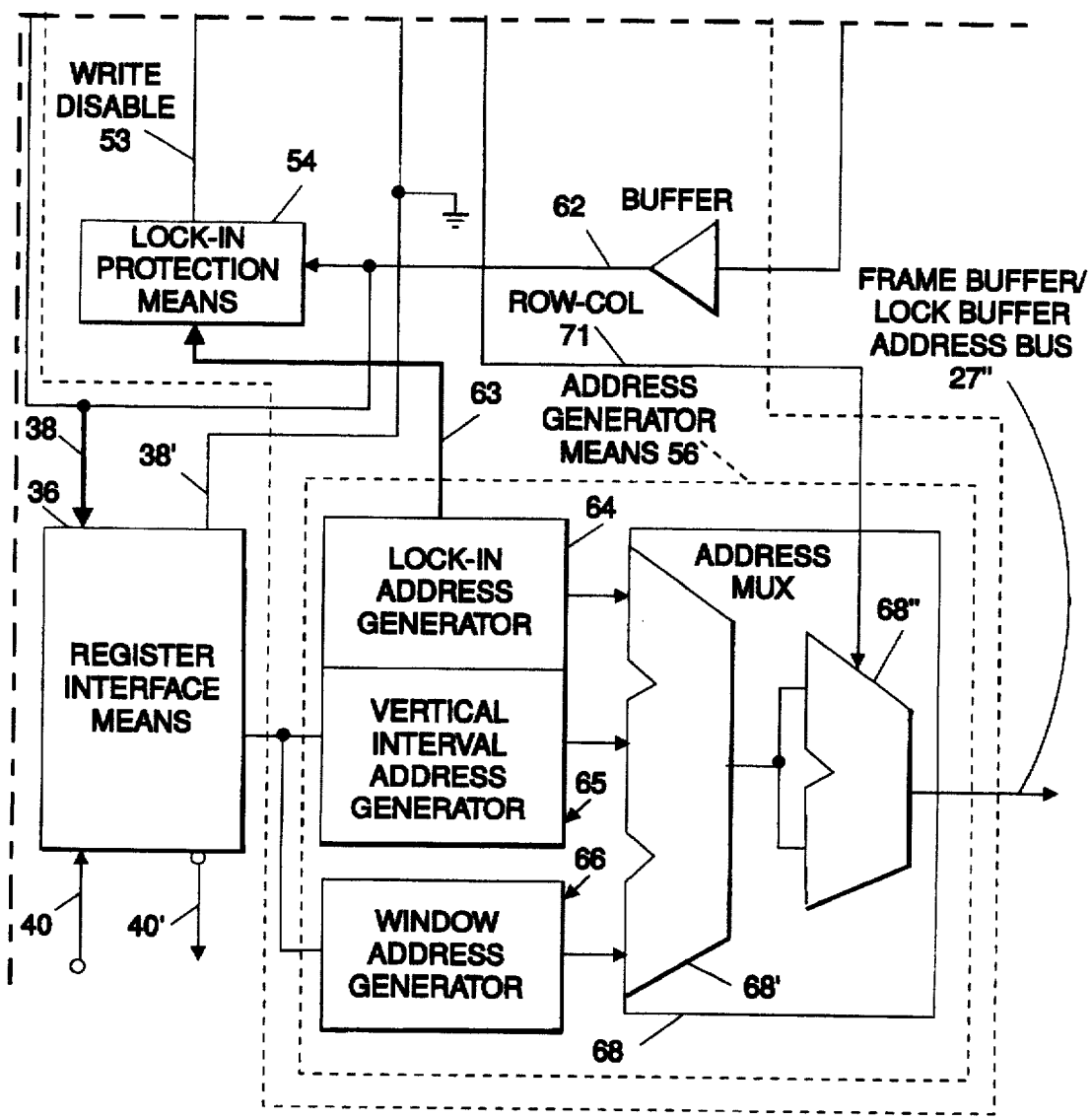

Referring to FIG. 2C, the address generator means 56 comprises vertical interval address generator 65, Lock-In Address generator 64 and window address generator 66. The output signals from each of the generators are fed into address multiplexor means 68. The address multiplexor means 68 is comprised of two multiplexor means 68' and 68" connected in tandem. The window address generator 66 provides the addresses necessary to write the line-video window data into the graphics video buffer memory 18.

The vertical interval address generator 65 provides the addresses necessary to write a captured vertical blanking interval data stream to the graphics video buffer memory 18. The lock-in address generator 64 generates the addresses necessary to access location in the lock buffer.

Address multiplexor 68' selects which address generator shall source addresses for memory cycles to the graphics video buffer 18 (FIG. 1). Address multiplexor 68' is an 18 bit 2-to-1 multiplexor with the selection sourced from the memory sequencer 50 providing a single 18 bit address.

Address multiplexor 68" selects which half of the 18 bit address shall be output to the graphics video buffer 18. The graphics video buffer is made up of either DRAM or VRAM, which uses a 9-bit multiplexed address. Address multiplexor 68" provides the proper 9-bit address with the selection sourced from the memory sequencer 50. The register interface means 36 provides the data path and primary interface control allowing either the system PC or the graphics controller access to the entire set of configuration registers within the video processor 24. Data into and out of the register interface means 36 on bussess 40 and 40', respectively are generated in the system PC and/or the graphics controller.

Still referring to FIGS. 2A and 2B, the video information processing means 30 includes the scaling means 70, output H/V cropping means 72 and dither and mode generator means 74. The scaling means 70 receives on its input high speed video information and scales or reduces the size of the information to fit a selected window on the computer graphics display. The output H/V cropping means 72 performs the final truncation necessary to size the scaled window to the exact pixel boundary desired in the computer operating system environment. This function is necessary since the scaling algorithm does not have a single pixel granularity.

The dither and mode generator means 74 provides dithering down (reduction) to RGB-16 or RGB-8 from RGB-24 bits per pixel. It should be noted that dithering is a well known high quality method of reducing the storage necessary for an image with minimum-quality degradation. The conversion means 34 receives at its input UYV video signals and converts them to digital RGB and delivers them to the scaling means 70, details of which are set forth in the above referenced docket and to the extent necessary to complete the background information are incorporated herein by reference. The data into conversion means 34 are provided over respective conductors from data synchronization means 44 and input cropping means 42. The input cropping means 42 extracts the active video data from the digitized video source. There are portions of time (horizontal and vertical blanking intervals) where active video data is not present. The input cropping means 42 captures the active data and skips over the blanking interval where there is no data. The digitized interface means 46 provides the control necessary to interface directly to the electronics that decodes and captures data from the NTSC signal. The codec interface means 43 provides the control necessary to interface directly to a video codec (compressor/decompression). Data sync means 44 receives a 24-bit pixel bus that may be either red 8-bits, green 8-bits, blue 8-bits digitized, or Y (luminance) 8-bits, V-8-bits, U-8-bits (chrominance) digitized. Luminance (Y) and chrominance (U, V) are basic components of PAL and NTSC television signal. This pixel data bus is sourced from either the codec means (25) or TV source means (23). All pixel data enters the video processor through this bus.

Two separate clocks are provided to the data sync means 44. The codec clock provides the timing at which to capture pixels from the input pixel bus and propagate a codec pixel. In the same manner, the digitizer codec provides the timing to capture the input pixel bus and propagate a digitized pixel.

The codec interface means 43 receives only one input, the CHSYNC or Codec CHSYNC. This input provides the timing instructing the video processor that a full input line of codec video data has been completed. The vertical sync is always sourced from the video digitizer and the codec must synchronize to the video digitizer vertically.

The digitizer interface means 46 receives an input clock CLKIN driven directly from the phase lock loop of the video decoder 15 (FIG. 1). The frequency of this input varies from 33 Mhz to 17 Mhz operating as the VCO output at the phase locked loop. DIVOUT is a programmably divided down signal which is output to the video decoder's phase lock loop as the reference signal to the phase lock loop. When in lock, DIVOUT's falling edge stays in constant phase with the horizontal sync of the video decoder. Sample is the clock to the video digitizer's analog to digital converter and commands the video digitizer to provide a digitized pixel to the video processor.

VERTIN is the vertical sync signal from the video digitizer. This signal acts as a reset to the video processor, instructing the video processor that the current field of video has completed and the next field is to begin. Having described the improved multimedia terminal, the remaining portion of this document will give a more detailed description of the memory controller mechanism which generates memory control signals for accessing the frame buffer 18.

Figure 3A:
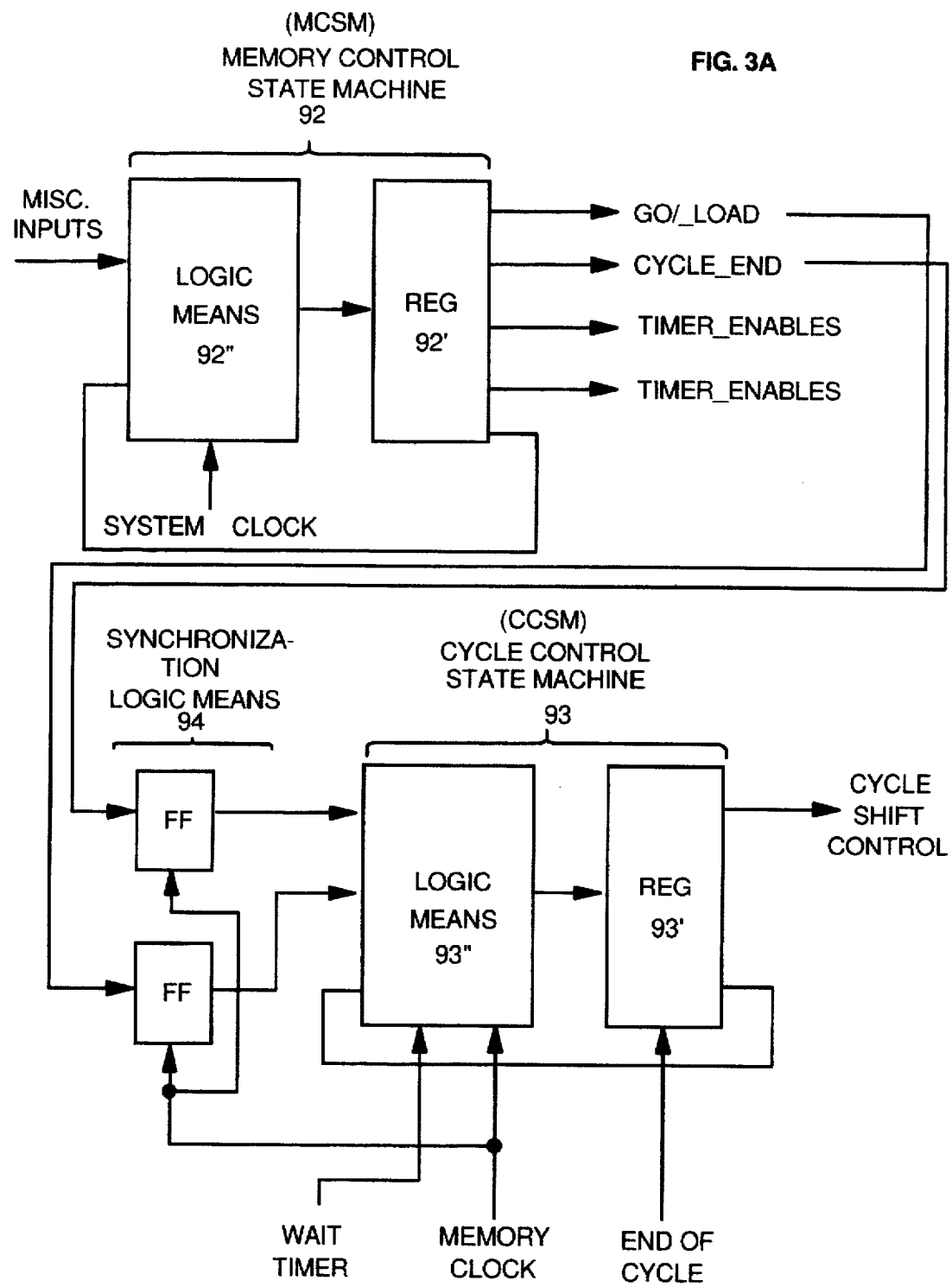
FIG. 3A shows a block diagram of the Memory Control State Machine Means 92 and the Cycle Control State Machine Means 93 found within the Memory Sequencer Means 50.

FIGS. 3 and 3A show block diagrams of the memory sequencer 50 (FIG. 2B). The memory sequencer is comprised of pattern registers array means 90, cycle generator means 91, Memory Control State Machine (MCSM) means 92, and Cycle Control State Machine (CCSM) means 93. The MCSM means 92 includes MCSM logic means 92' connected to MCSM Reg 92'.

The outputs from MCSM Reg 92' are coupled to Cycle Control State Machine (CCSM) means 93 by Synchronization Logic means 94. CCSM Reg 93' is connected to the output of the CCSM logic means 93'.

The pattern register array means 90 is comprised of a plurality of pattern register labeled a, b, c, d, e, ... n through N-1. One of the registers, such as N-1, is labeled Loop Register and stores the beginning and ending shift register position (to be described hereinafter) whereat looping is performed in order to maintain the body of the memory signal when a page mode cycle operation is executed. The pattern registers contain the patterns which are to be loaded in the cycle generators (to be described hereinafter) at the beginning of a memory cycle and then shifted through the cycle generators, creating a group of memory cycles.

Still referring to FIG. 3, the cycle generators array means 91 include a plurality of individual cycle generator identified by numerals a', b', c', d', e' ... n'. Each of the cycle generators is connected to respective ones of the previously described pattern registers. The outputs from the cycle generators provide the direct memory control signals which are provided on bus 27 (FIG. 1) to access the graphics video buffer previously described. In addition to the direct memory control signals, the cycle generators generate other signals such as the row column signal timers which are used for internal control logic. Included in the timers are end of cycle signal, the increment address (INC-ADDR) signal, Read FIFO signal, and a Capture/Read Data signal. As stated previously, the cycle generators work to create a group of digital bit streams used to control various types of RAMs.

Referring now to FIG. 3A, the output from the Memory Control State Machine is coupled though synchronization logic means 94 to the Cycle State Machine 93. The output signal from Cycle Control State Machine 93 is labeled Cycle Shift Control and is delivered to the cycle generators for shifting the loaded pattern to provide a desired memory output waveform. The Memory Control State Machine is designed upon the system clock, and has two primary outputs, a Go/Load, and Cycle End. The Go/Load output and the Cycle End output are fed into Synchronization Logic Means 94 and controls the Cycle Control State Machine 93. To ensure proper operation, the Go/load signal and the Cycle End signal must be (glitch-free). To provide the glitch-free signals, the Go/Load signal and the Cycle End signal are outputted from the MCSM register (REG) 92'. The Go/Load signal tells the Cycle Control State Machine to process memory cycles or load new values in the cycle generators (details to be given hereinafter). The default state is to load values, continuously, until it is time to process memory cycles. This state machine is also responsible for all control logic that remains constant throughout a group of memory cycles, for example; generate signals shown as Timer Enables to enable off chip data drivers, direction of chip data drivers, enabling of address bus drivers, selection of memory write/read cycles, selection of memory page/non-page-mode cycles.

Still referring to FIG. 3, the pattern register array means 90 stores the basic patterns to be shifted to generate the desired memory cycle. In one embodiment of the present invention the pattern register array means 90 includes six 8-bit values and three 3-bit values (3-bit values decoded to an 8-bit timer pattern). Four of the six 8-bit patterns control the following memory control signals; namely; row address strobe (RAS), column address strobe (CAS), write enable (WE), and output enable (OE). It should be noted that the output enable memory control signal is a signal generated when the processor wishes to read information from the memory. The fifth 8-bit pattern controls the row to column address multiplexor (to be described hereinafter) required for DRAM and VRAM implementations (a 16-bit address is time multiplexed down to an 8-bit address). The sixth 8-bit pattern was used to store the wait state pattern. The wait state pattern register reduces the storage requirements necessary for complex patterns. By utilizing the wait state pattern, a 16 clock cycle long pattern may only require an 8-bit pattern register and 8-bit cycle generators. The described implementation had one wait state for all cycles with separate wait state enablers for read and write cycles.

A likely candidate for improvement to this implementation could be the allowance of different wait state patterns for each cycle type. This modification would utilize a multiplexor feeding the cycle generators to select which wait pattern to load into the wait state cycle generator. The multiplexor should be controlled by the memory control state machine. The pattern registers are accessed through the microprocessor interface. At power-on, the pattern registers are loaded from the microprocessor. The Memory Control State Machine powers up inactive with the memory interface tri-stated.

Figure 6A:
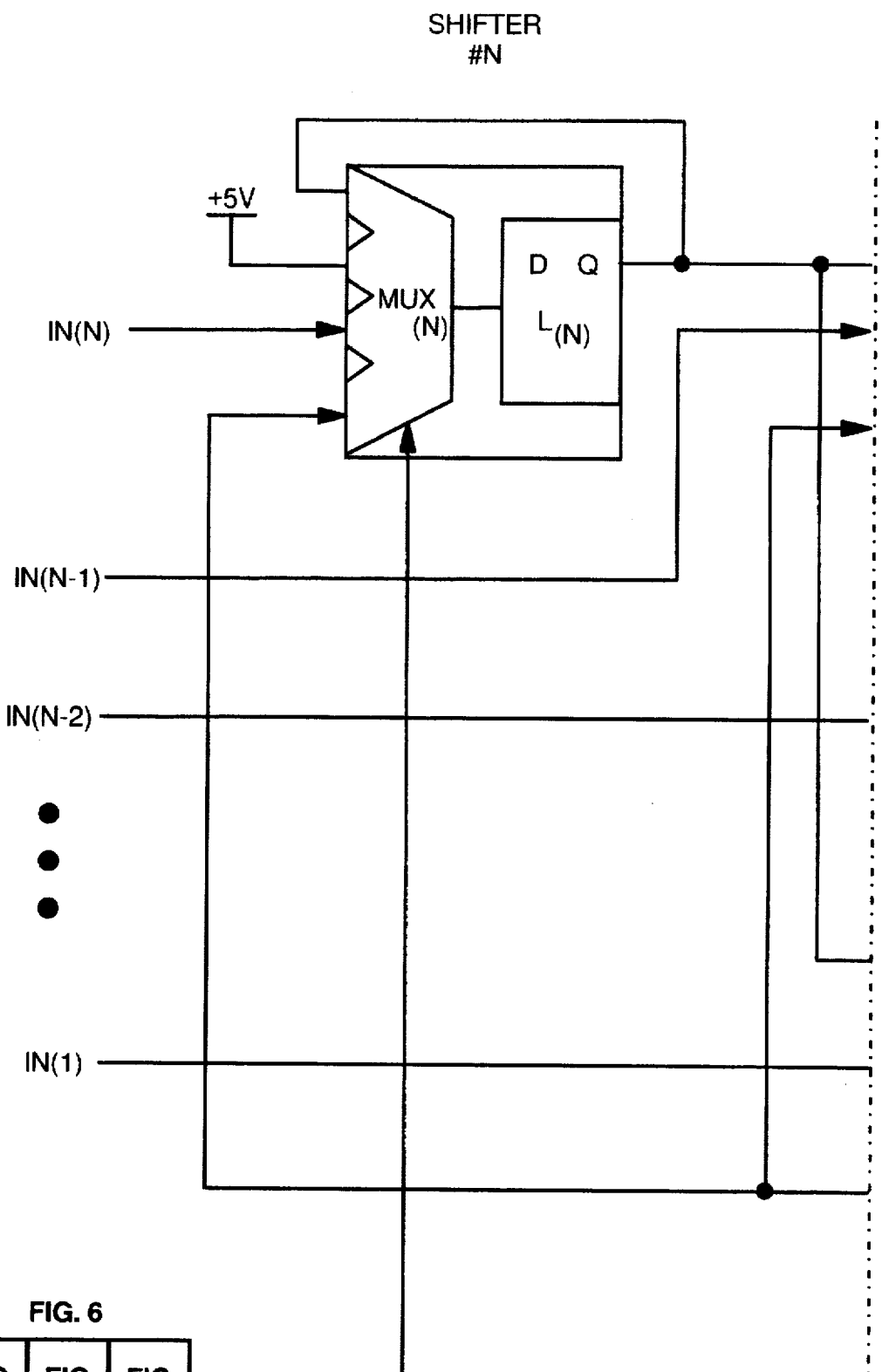
FIG. 6 (consisting of FIGS. 6A, 6B and 6C) shows a block diagram of an N-bit cycle generator which is a single unit of the cycle generator means 91 found in FIG. 3.
Figure 6:
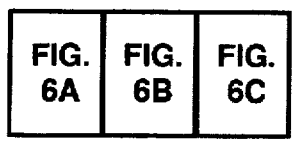
Figure 6B:
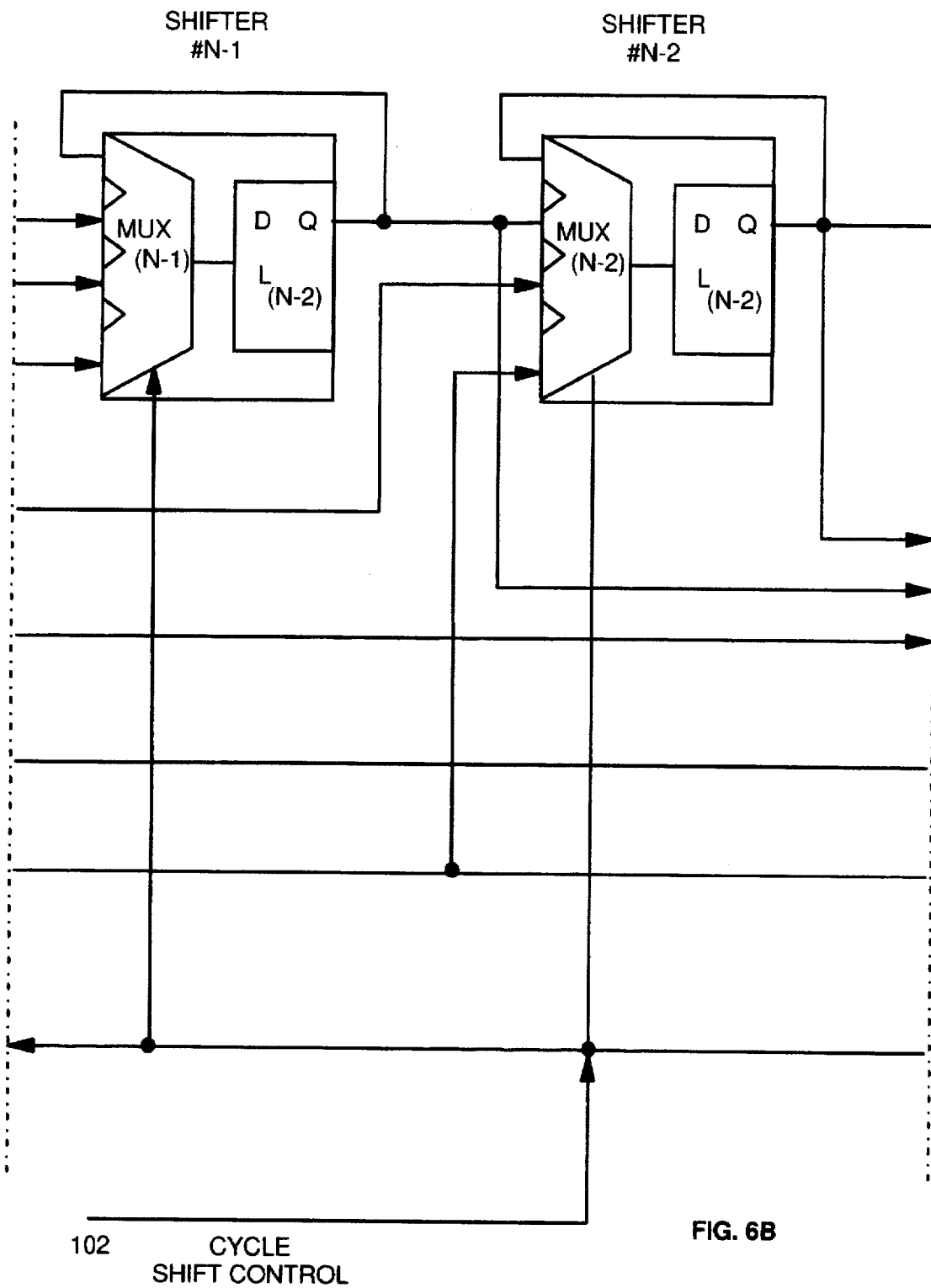
Figure 6C:
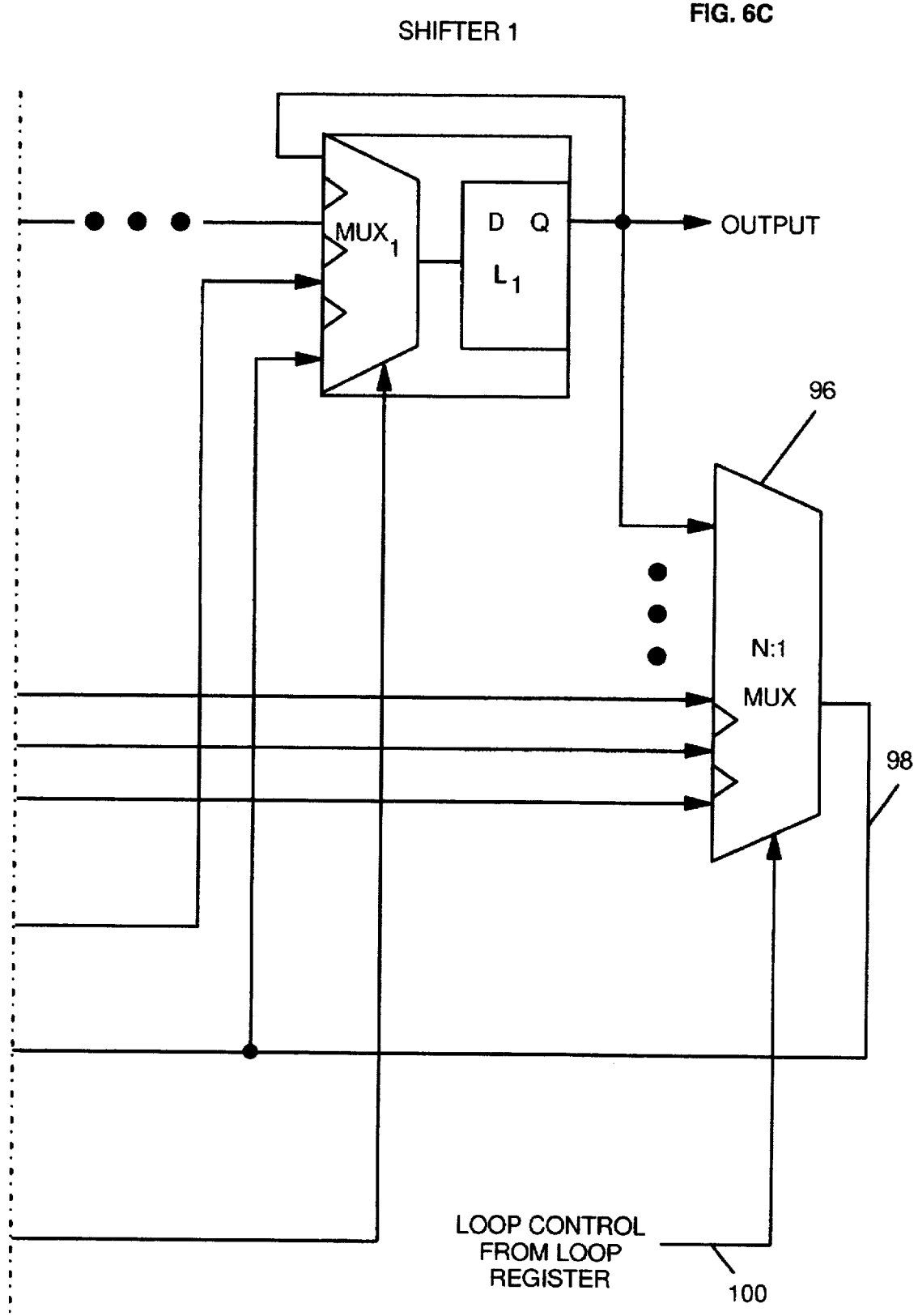

FIG. 6 shows a circuit diagram for one of the cycle generators, the others being similar. The cycle generator is comprised of a plurality of shifters labeled 1 through N and interconnected in shift register fashion. An N:1 multiplexor (MUX) 96 receives the output signal from each shifter and generates an output signal on conductor 98 which is fed back as an input to each shifter of the chain. Each shifter (stage of the Shift Register) is formed from a latch L connected to an MUX. For purposes of description, each latch L and its connected MUX is labeled with like numerals as it shift position. Therefore, the Latch and MUX in shifter 1 is labeled L1 and MUX1. Similarly, the latch and MUX in shifter N-2 is labeled $L_{N-2}$, $MUX_{N-2}$ and so forth. It is worthwhile noting in FIG. 6 that the dots represent additional stages or shifters which a designer wishes to use. For each added shifter, an input is required from its associated pattern register and its output is connected to an input of MUX 96.

Still referring to FIG. 6, the MUX in each shifter stage has N inputs. In an embodiment of the present invention, N was made equal to 4. The four inputs to each MUX include an input data line labeled IN(n), IN(n-1) . . . IN(1). The other inputs into the MUX include a feedback path from the register, the output from the respective MUX connected shift Registers, the output from the preceding shifter and the signal on conductor 98 from MUX 96. As will be described hereinafter, the feedback signal from MUX 96 is activated when looping is required between selected outputs of the shifters. The looping phenomenon is used to reproduce the body portion of an output signal pattern. A loop control signal from loop register FIG. 3 is provided on conductor 100. Each MUX in the shifter is controlled by the cycle shift control signal on conductor 102. Preferably conductor 102 has at least two wires which carries two signals used by each MUX to select one of its several inputs.

Referring again to FIG. 6, each cycle generator is responsible for taking the respective pattern value in its connected pattern register, and with the proper shift controls (from the cycle control state machine) produces the desired digital bit stream pattern to control the memory chips. Each shifter (i.e., a staged in the shift register) can be individually controlled to be in one of the following states: retain the current value, shift in the previous (downstream) shift element value, load the pattern register value, and load the N:1 MUX value. One of the features of the present invention is that the pulses outputted from a cycle generator can be separated into different sections. In one of the implementations, the pulses are broken into a prelude section, a body section, and a postlude section. For this configuration, two m-bit values determine the breakup of the pattern to be shifted. The m-bit values form pointers to the shifter elements which mark the beginning and end of the body of the pattern. The portion to the right of the body is referred to as the prelude. The portion to the left of the body is referred to as the postlude. In one embodiment of this invention, the body pointers are a 3-bit value, supporting an 8-bit pattern. It should be noted that this breaking up of a pattern is to clarify the flexibility of control for a cycle generator. While a prelude, body and postlude cycle is optimum for bursts of page-mode cycles; a prelude only cycle is optimum for a single randomly accessed memory cycle. Minimizing the length of the body portion of a pattern increases the peak bandwidth of the memory interface.

FIGS. 7 through 10 are graphical representations of shift patterns in the cycle generator for providing different sections of the wave pattern. This is particularly beneficial if the memory is operated in page mode.

Figure 7:
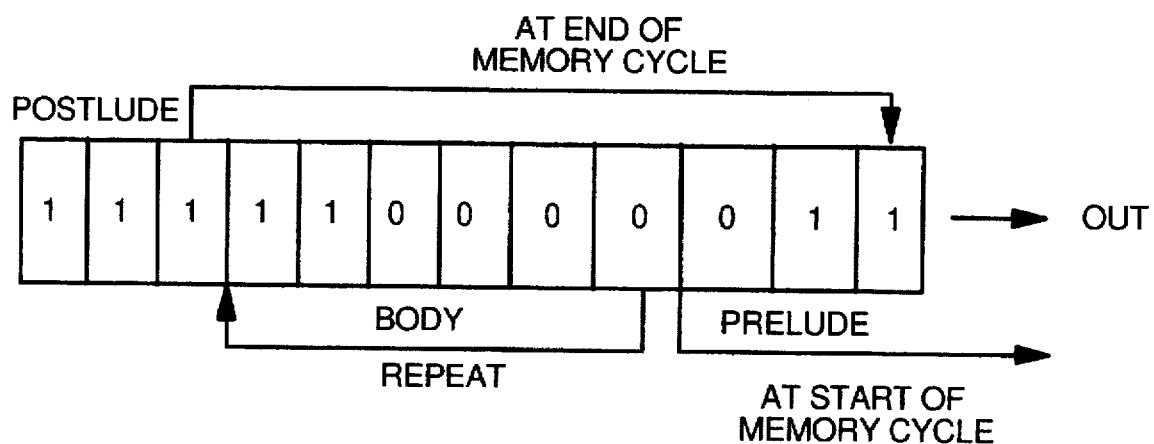
FIG. 7 shows a shift sequence for a single cycle generator that uses a prelude, body and postlude.

FIG. 7 shows a shift sequence for a single cycle generator that uses a prelude, body, and a postlude. This type of cycle utilizes the full capability of a cycle generator. At the beginning of the cycle, the multiplexors are selected to shift the beginning-body into the end-body position, holding the postlude pattern in place. In this manner, the prelude and body are shifted out of the cycle generator followed by a repeating body pattern. Once the cycle control state machine, to be described hereinafter, indicates the end of a group of memory cycles desired, the multiplexors are changed to shift the beginning of the postlude to position number 1. This configuration is maintained until the postlude is properly shifted out of the cycle generator.

Figure 8:
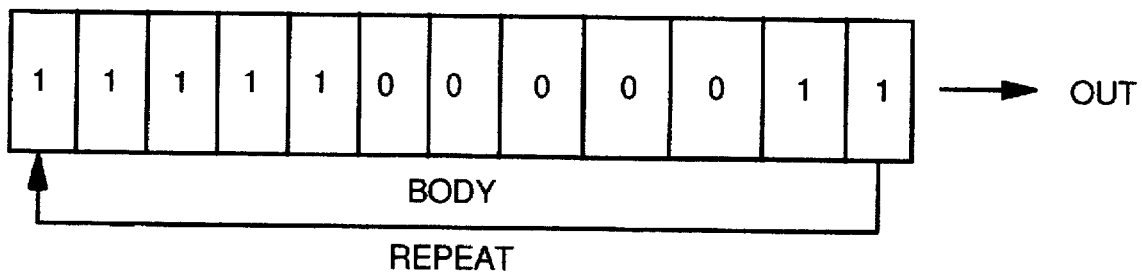
FIG. 8 shows a shift sequence for a single cycle generator that uses a body only cycle.

FIG. 8 shows a shift sequence for a single cycle generator that uses body only cycle. By manipulating the two body pointers, various other cycle derivations can be utilized. With a beginning-body pointer of one and a body pointer at the end, a body only cycle is generated.

Figure 9:
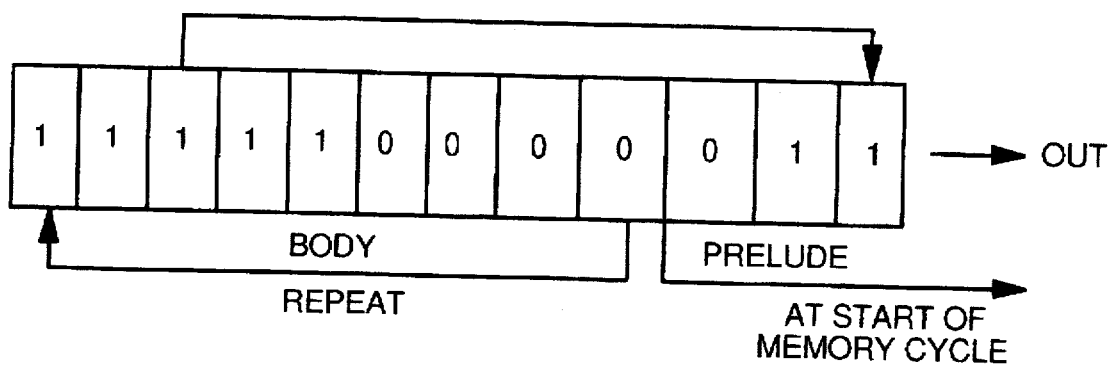
FIG. 9 shows a shift sequence for a single cycle generator that uses a prelude and body cycle.

FIG. 9 shows the shift sequence for a single cycle generator that uses a prelude and a body cycle. To generate the prelude and body cycle an end-body pointer of N is required.

Figure 10:
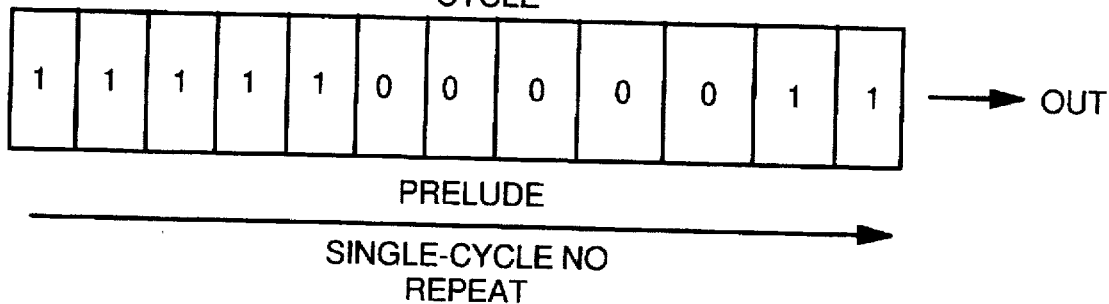
FIG. 10 shows a shift sequence for a single cycle generator that uses a prelude only cycle.

FIG. 10 shows a prelude cycle for a shift sequence of a single cycle generator. This requires a begin-body pointer and an end-body pointer.

Figure 11:
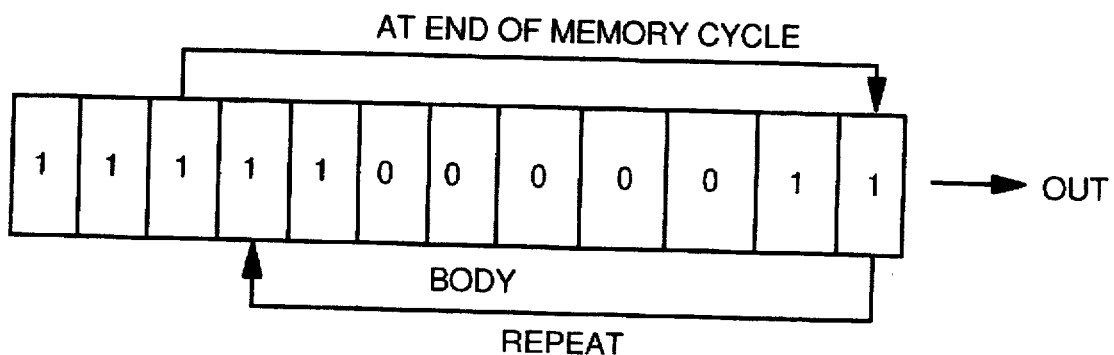
FIG. 11 shows a shift sequence for a single cycle generator that uses a body and postlude cycle.

FIG. 11 shows a body and postlude cycle. This requires a begin-body pointer of 1, and a repeat of the body portion. At the end of the cycle, the postlude is moved into the first 3-bit position of the cycle generator. In one implementation of the present invention, the use of both normal read/write cycles and page mode cycles define one set of pattern register (i.e., random cycles utilized a prelude only cycle, page-mode cycles used the full prelude, body and postlude cycles).

Figure 4:
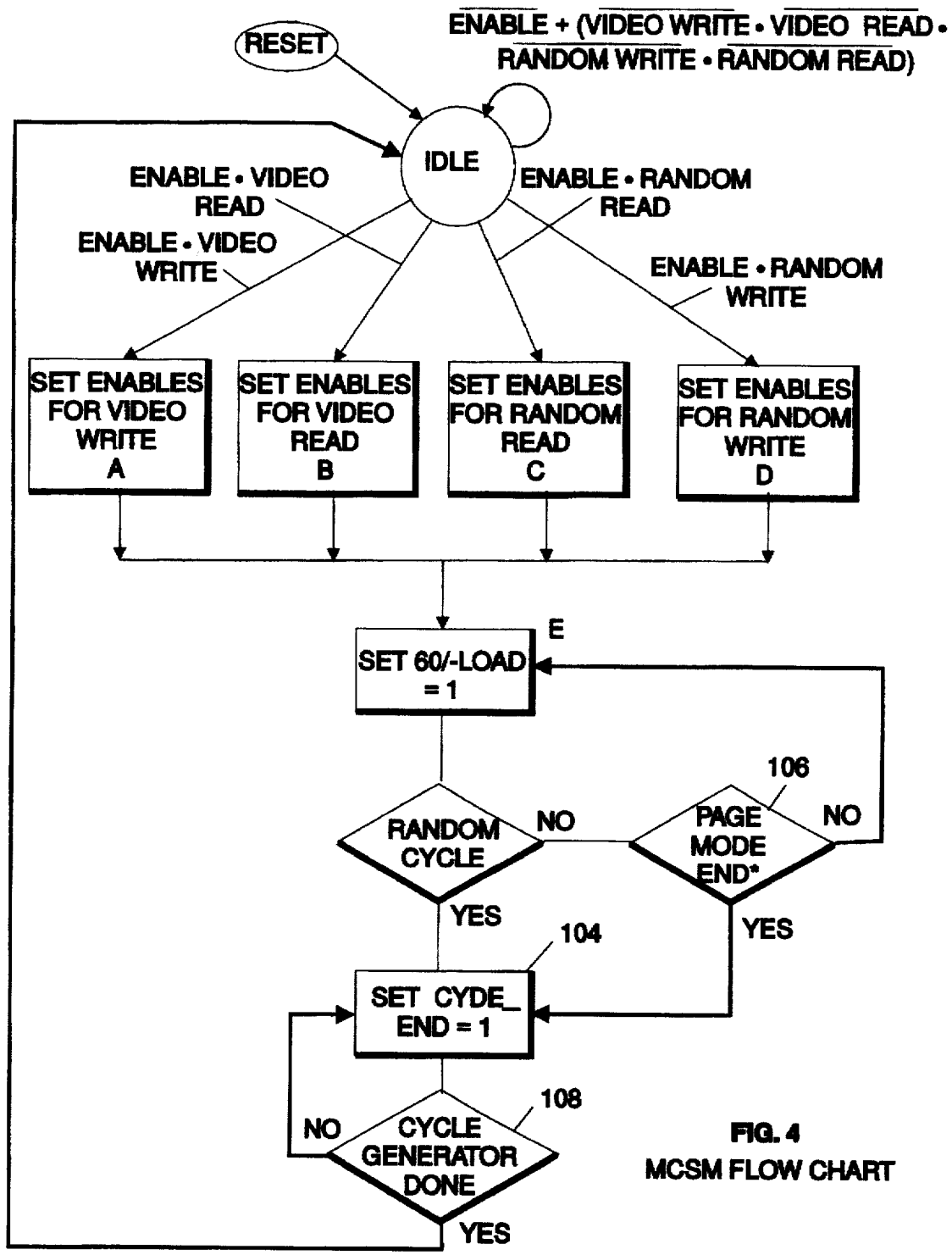
FIG. 4 shows a flowchart defining the function of the Memory Control State Machine Means (MCSM) 92.

FIG. 4 shows a flowchart defining the function of the memory control state machine 92 (FIG. 3A). The memory control state machine (MCSM) is responsible for receiving requests for work and ensuring these requests are serviced by the Cycle Control State Machine. The Memory Control State Machine uses two outputs labeled Go/Load and Cycle End (FIG. 3A) to carry out its responsibility.

Still referring to FIG. 4, upon receiving a request input, the MCSM immediately goes into the IDLE state. The MCSM remains in the IDLE state until the MCSM is both enabled (enable input equals true) and one of the four types of memory cycles, video write or video read or random read or random write, is requested. Once these two conditions are met, the MCSM then sets the proper timer enable (blocks A or B or C or D) for the requested cycle, then sets the Go/Load to Go (logical "1", Block E). If the desired cycle is random (i.e. only a single non-page mode cycle), then cycle end is asserted (block 104). If the cycle is not random (repeated page mode cycle), then only Go/Load is asserted until the Page Mode End input is asserted (block 106). Once assertion of the end cycle output has been made, the MCSM must wait until the cycle generators have completed shifting the postlude. This is indicated by a special timer that is generated by a cycle generator in which the output is active from the completion of the postlude until the cycle generators are reloaded. This timer is a cycle generator output to the MCSM. This signal crosses a clock domain and must be resampled in the MCSM domain. The signal remains active, therefore, there is not problem with the slower MCSM resampling of the signal.

Still referring to FIG. 4, once the state machine exits block 106, it also sets cycle end equal to one and descends into decisional block 108, where it tests to see if the cycle generator is done. If no, it loops to block 104. If yes, it reverts to the IDLE state. With respect to block 106, the page mode test is a logical "or" of the DRAM/VRAM page boundary crossing, FIFO Empty, (that is no data), bus ram removed, and lock cycle complete (video-read only).

Figure 5:
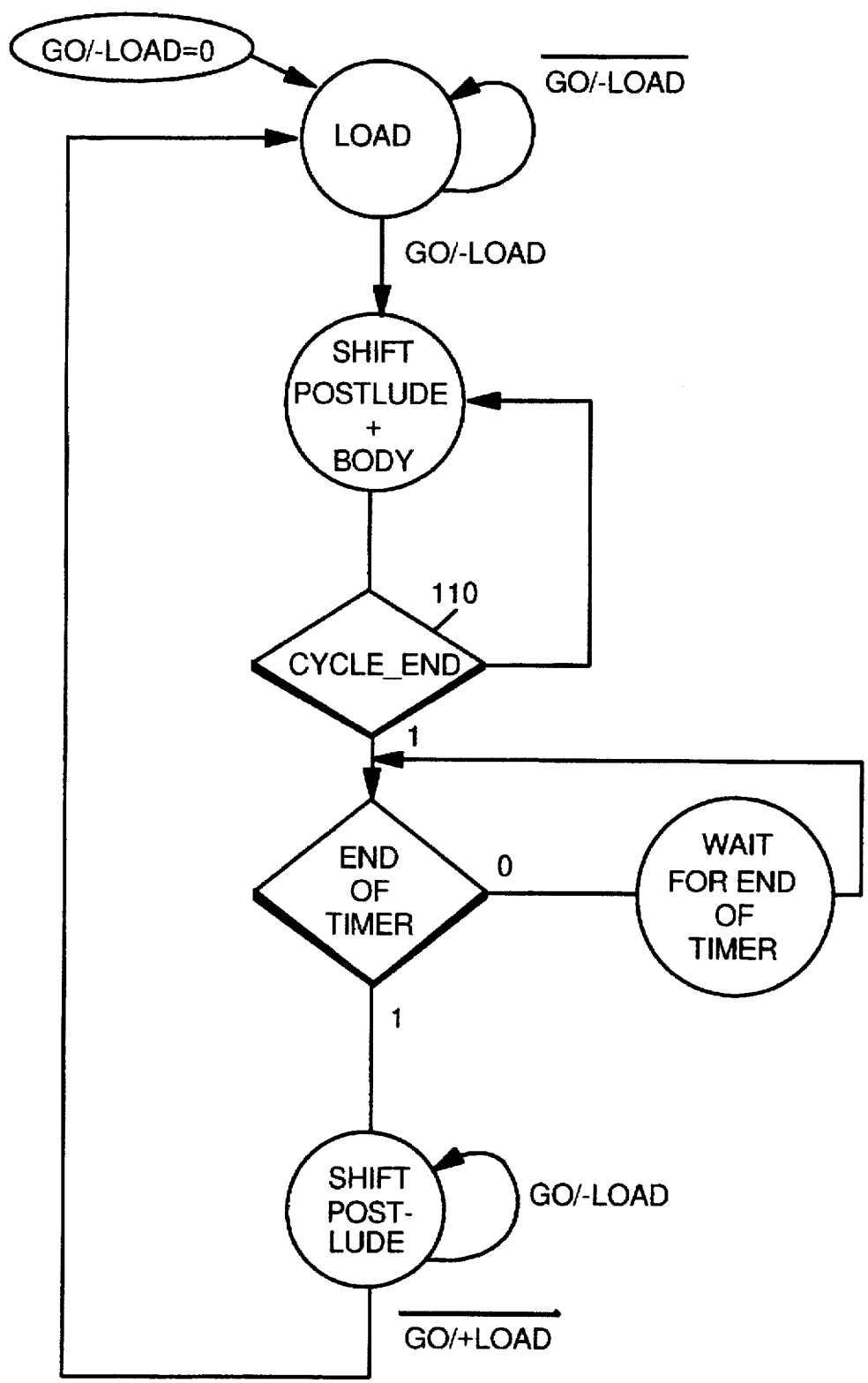
FIG. 5 shows a flowchart defining the function of the Cycle Control State Machine (CCSM).

FIG. 5 shows a flowchart defining the function of the Cycle Control State Machine (CCSM). The Cycle Control State Machine is responsible for all direct control of the cycle generators. The CCSM receives two input signals, Go/Load and End Cycle from the Memory Control State Machine and generates the proper shift controls which control the cycle generators producing the proper memory control and external control signals for the memory interface.

Still referring to FIG. 5, the Go/Load signal, when set to logical 0, acts as a reset when at the load level. The CCSM loads the cycle generators with the data contained within the pattern registers. Upon the go level, the CCSM then starts shift sequence with the prelude (if prelude is included in the preprogram patterns for the cycle generators) is shifted first, then the body is shifted repeatedly until the Cycle End input (block 110) is received as active signal from the MCSM (FIG. 3). It is important to note that the cycle end input must be synchronized with the end of cycle timer input before the shift control outputs are changed to shift the postlude through the cycle generators. The synchronization function is provided by the synchronization logic means 94 (FIG. 3A). Once both the Cycle End input and the End of Cycle timer inputs are received, the shift control outputs are changed to shift the postlude through the cycle generators. The postlude shifting is maintained until the MCSM returns the Go/Load signal to the load level.

FIG. 12 shows a typical group of memory cycles for a DRAM memory system operating in page mode. The curve at the top of the figure represents the memory clock. The curves thereafter are marked with appropriate names on the lefthand side of the figure. The memory clock defines the length of time that a single pattern bit is active. The Go/Load and Cycle End signals (generated by the MCSM) are internal signals used by the memory controller and are shown for reference purposes. The memory control signals RAS, CAS, WE, and OE are each generated from a different cycle generator in the manner described above. FIG. 12 represents an 8-bit cycle generator with 3-bit starts/end body pointers. The RAS pattern is 11110001B. The CAS pattern is 11110111B.

The breakup of the pattern is shown below:

|  | Postlude | Body | Prelude |
|---|---|---|---|
| _RAS | 1 1 1 1 | 0 0 | 0 1 B |
| _CAS | 1 1 1 1 | 0 1 | 1 1 B |

The start body pointer is set to 010B and the end body pointer is set to 011B. The DRAM memory module responds to the sequence of control signals by performing three page mode writes of WDATA0, WDTA1, and WDTA2; then followed by three page mode reads of RDATA0, RDATA1, and RDATA2. The 18-bit memory address is broken into two 9-bit addresses referred to as Row address and Column address in the figure.

Several benefits inure to the user of the present invention. Included in the benefits are: a) both the memory cycles can be redefined and the memory cycle clock frequency can be changed with a minimum impact to the rest of the system of the VLSI chip implementation of the interface (memory controller). In addition, the flexibility of the memory cycle definition allows interfacing with virtually any type of slave devices including all DRAM memory cycles, all SRAM memory cycles, all VRAM memory cycles, program of the wait state, etc. In addition, the independent memory cycle clock versus system clock allows fine granularity of memory cycle definition and optimum memory interface performance.

Even though the present invention has been described with a particular embodiment, this should not be construed as a limitation on the scope of the invention. Various changes and modifications may be made within the spirit and scope of the invention. The claims set forth hereinafter are intended to cover such changes.

Having thus described our invention, what we claim as new and desire to secure by Letter Patent is:

1. A device for generating Memory Control Signals comprising:
   a Pattern Register array including a plurality of multistage registers each one being operable for storing bit patterns to be used to generate memory cycle control pulses;
   a first means for loading the bit patterns into the registers;
   a Cycle Generator array including a plurality of cycle generators wherein each of the plurality of cycle generators is coupled to a separate one of the plurality of multistage registers and each of said plurality of cycle generators including a plurality of shifters interconnected in shift register configuration with each shifter including a latch and a MUX with a latch input connected to the MUX; and
   a Cycle Control State Machine having an output coupled to the MUX in each shifter and generating proper shift control signals wherein desired memory control pulses are outputted from one of the latch.

2. The device of claim 1 further including the memory for writing data or reading data in response to a digital bit control pulses.

3. The device of claim 2 wherein the memory includes a video buffer for storing data to be displayed.

4. The device of claim 3 further including a graphic controller, coupled to the video buffer, for providing signals in response to an application program executed on the first means to alter information in the video buffer.

5. The device of claim 4 further including interface means for receiving information from the video buffer and converting said information to signals compatible for display.

6. The device of claim 4 further including a graphic display means coupled to the interface means.

7. The device of claim 2 wherein the memory includes a DRAM.

8. The device of claim 2 wherein the memory includes a VRAM.

9. The device of claim 2 wherein the memory includes a RAM.

10. The device of claim 1 wherein the first means includes a personal computer.

11. The device of claim 1 further including an N:1 multiplexor with N inputs, N being an integer greater than 1, connected to an output of each shifter elements and a single output connected to an input of each shifter element.

12. The device of claim 11 further including loop registers with outputs coupled to the N:1 multiplexor; said loop registers storing bit patterns representing beginning and ending shifter positions whereat looping is to be performed.

* * * * *